United States Patent [19]

Perez et al.

[11] Patent Number: 4,961,777

[45] Date of Patent: Oct. 9, 1990

[54] PRETREATMENT/AGGLOMERATION AS A VEHICLE FOR REFRACTORY ORE TREATMENT

[75] Inventors: Jesus W. Perez, New Orleans; Melvin J. Barrois, Belle Chasse; Thomas H. McCord, Harvey, all of La.; Gregory R. O'Neil, Marmion, Australia

[73] Assignee: Freeport-McMoRan, Inc., New Orleans, La.

[21] Appl. No.: 227,639

[22] Filed: Aug. 3, 1988

[51] Int. Cl.$^5$ ............................................. C22B 11/00
[52] U.S. Cl. ....................................... 75/313; 75/747; 75/735; 75/737; 75/324; 423/29
[58] Field of Search ................. 75/118 R, 105, 3, 111, 75/114, 101 R; 423/29, 31, 38

[56] References Cited

U.S. PATENT DOCUMENTS

| | | | |
|---|---|---|---|
| 588,476 | 8/1897 | Rhodes | 75/3 |
| 731,590 | 6/1903 | Merrill | 75/118 R |
| 825,920 | 7/1906 | Merrill | 423/29 |
| 3,420,453 | 1/1969 | Tada | 75/3 |
| 3,639,925 | 2/1972 | Scheiner | 75/118 R |
| 4,256,705 | 3/1981 | Heinen et al. | 423/27 |
| 4,256,706 | 3/1981 | Heinen | 75/118 R |
| 4,259,107 | 3/1981 | Guay | 75/118 R |
| 4,289,532 | 9/1981 | Matson et al. | 75/118 R |
| 4,801,329 | 1/1989 | Clough et al. | 75/118 R |

OTHER PUBLICATIONS

"Silver and Gold Recovery from Low-Grade Resources", by McClelland, et al., Mining Congress Journal, 1981, pp. 17-19.

Primary Examiner—Robert L. Stoll
Assistant Examiner—Steven J. Bos
Attorney, Agent, or Firm—Fisher, Christen & Sabol

[57] ABSTRACT

An agglomerative heap leaching method for recovering gold, silver or other metals from low grade refractory ores. Hypochlorite compounds are incorporated directly into the ore agglomerates as they are formed. This provides ample time and opportunity for the hypochlorite to destroy, modify or passivate refractory components of the ore thereby improving metal recovery in the subsequent cyanide leaching step.

20 Claims, 3 Drawing Sheets

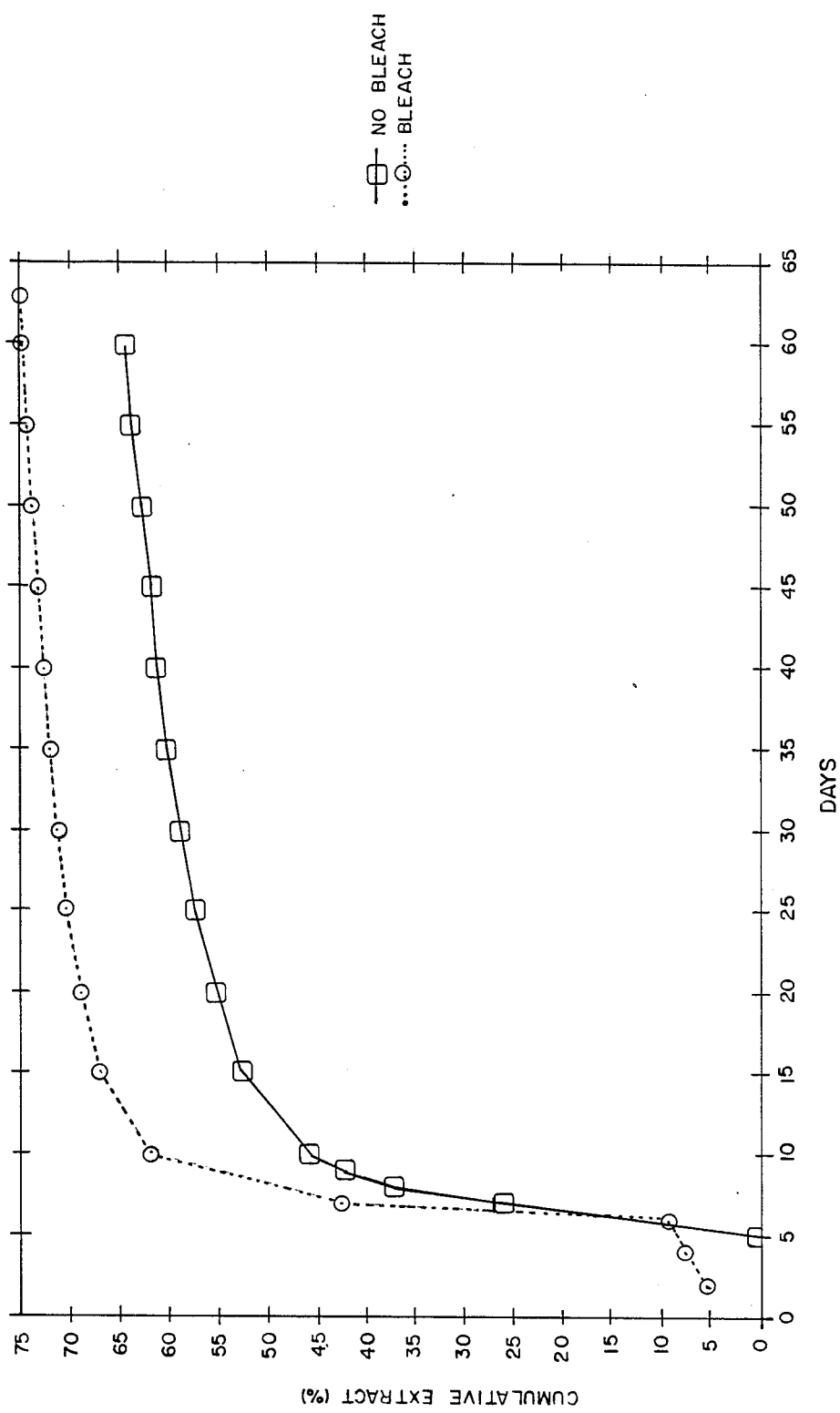

PRETREATMENT/AGGLOMERATION AS A VEHICLE FOR REFRACTORY ORE TREATMENT

BACKGROUND OF THE INVENTION

1. Field of the Invention

This invention relates to a method for the recovery of primarily gold and silver from low-grade refractory ores whose refractory nature is caused by their content of sulfidic and/or organic carbonaceous matter, and more particularly, it relates to an agglomerative heap leaching method for recovering gold and silver from such ores.

2. Prior Art

In recent years the price of gold has increased dramatically. At the same time, many of the existing high-grade, free milling gold ore deposits have become largely exhausted after many years of active mining. Due to the gold price increase and to the increasing scarcity of high grade, free milling ore deposits, the mining industry has intensified its efforts to develop techniques for processing low grade gold ores, i.e. ores containing less than about 0.10 ounces gold per ton of ore. Large deposits of such gold ores occur in various countries throughout the world, including the United States. Similarly, such large deposits of low grade silver ores occur throughout the world.

Many of these low grade gold and silver deposits present a particularly difficult problem to would-be processors because of the refractory nature of the ore, i.e. refractory ores are ores whose gold and silver values cannot be economically recovered by conventional cyanidation techniques. The refractory nature of an ore can be caused by a number of factors. For example, certain sulfidic and/or organic carbonaceous components, if contained in an ore, are especially notorious for causing the ore to be resistant to conventional cyanidation. The present process is directed toward those ores whose refractory nature is largely caused by sulfidic and/or carbonaceous matter.

The mining industry has developed a number of successful processes for treating high grade gold ores which are refractory because of their content of sulfidic and/or organic carbonaceous matter. Two of the best known processes, described in U.S. Pat. No. 4,289,532 to Matson et al. and U.S. Pat. No. 4,038,362 to Guay, subject the refractory ores to a preoxidation treatment step utilizing chlorine and chlorine—containing compounds. Although the preoxidation treatments are very effective in rendering the ores nonrefractory, the exact method by which the preoxidation treatment works is not yet completely understood. In some instances, the refractory components are converted to nonrefractory components, e.g. refractory sulfides are converted to nonrefractory sulfates. In other instances, refractory organic carbonaceous components are deactivated so that they do not compete with activated carbon and adsorb gold in subsequent cyanide leach/carbon adsorption operations. In still other instances, the refractory components are destroyed, decomposed or in some other manner, often unexpected, rendered nonrefractory by the preoxidation step. These preoxidation treatment processes are too expensive to economically treat the low grade refractory ores which are the subject of the present invention.

Heap leaching has long been used to recover gold, silver and other valuable minerals from ores where either the ore grade or the amount of reserves is inadequate to justify a conventional plant. In recent years, its use in the gold mining industry has accelerated as the demand and price of gold have risen. One of the most attractive features of heap leaching is its simplicity. Ore is placed on an impervious base and a lixiviant for gold and silver, usually an alkaline cyanide solution, is sprinkled over the ore and allowed to percolate through the heap. The desired metal-bearing solutions drain from the heaps, are collected in ponds, and the desired metal values are recovered in activated carbon columns, in zinc precipitation units or by other means. Heap leaching of ores with good percolation characteristics will result in metal recovery efficiencies of over 50%.

If an ore has an excessively high clay or fines content as is often the case, agglomeration or binding of the fine ore particles prior to heap leaching is usually recommended. The agglomeration procedure consists of mixing the crushed ore with portland cement and/or lime and water which may contain cyanide, tumbling the mixture to allow agglomerates to form, and then aging or curing the product for a period of time. Agglomeration increases solution flow rates, improves recovery efficiency and reduces the leaching cycle time. Often the improvements are dramatic and, as a result, the use of agglomerative heap leaching to recover gold from low grade ores is rapidly growing. Unfortunately, low-grade ores which are also refractory because of their content of sulfidic and/or organic matter will often continue to exhibit relatively poor recovery efficiencies, i.e. less than about 40% when agglomerative heap leaching methods, as presently practiced, are used.

A need thus exists, and particularly in the gold and silver mining industry, for an agglomerative heap leaching method that can economically recover gold and silver from low grade ores which are refractory because of their content of sulfidic and/or organic carbonaceous matter.

The object of this invention is to provide an economic agglomerative heap leaching method for recovering gold and silver from low grade ores which are refractory because of their content of sulfidic and/or organic carbonaceous matter.

BRIEF DESCRIPTION OF DRAWINGS

FIG. 3 is a graph containing two curves showing cumulative percentage gold extraction versus leaching time for an agglomerated gold-containing ore. One curve on the graph provides gold extraction data for the ore agglomerates prepared with sodium hypochlorite incorporated in the agglomerates. The second curve on the graph provides gold extraction data for the ore agglomerates prepared without sodium hypochlorite incorporated in the agglomerates.

SUMMARY OF INVENTION

Figure 1:
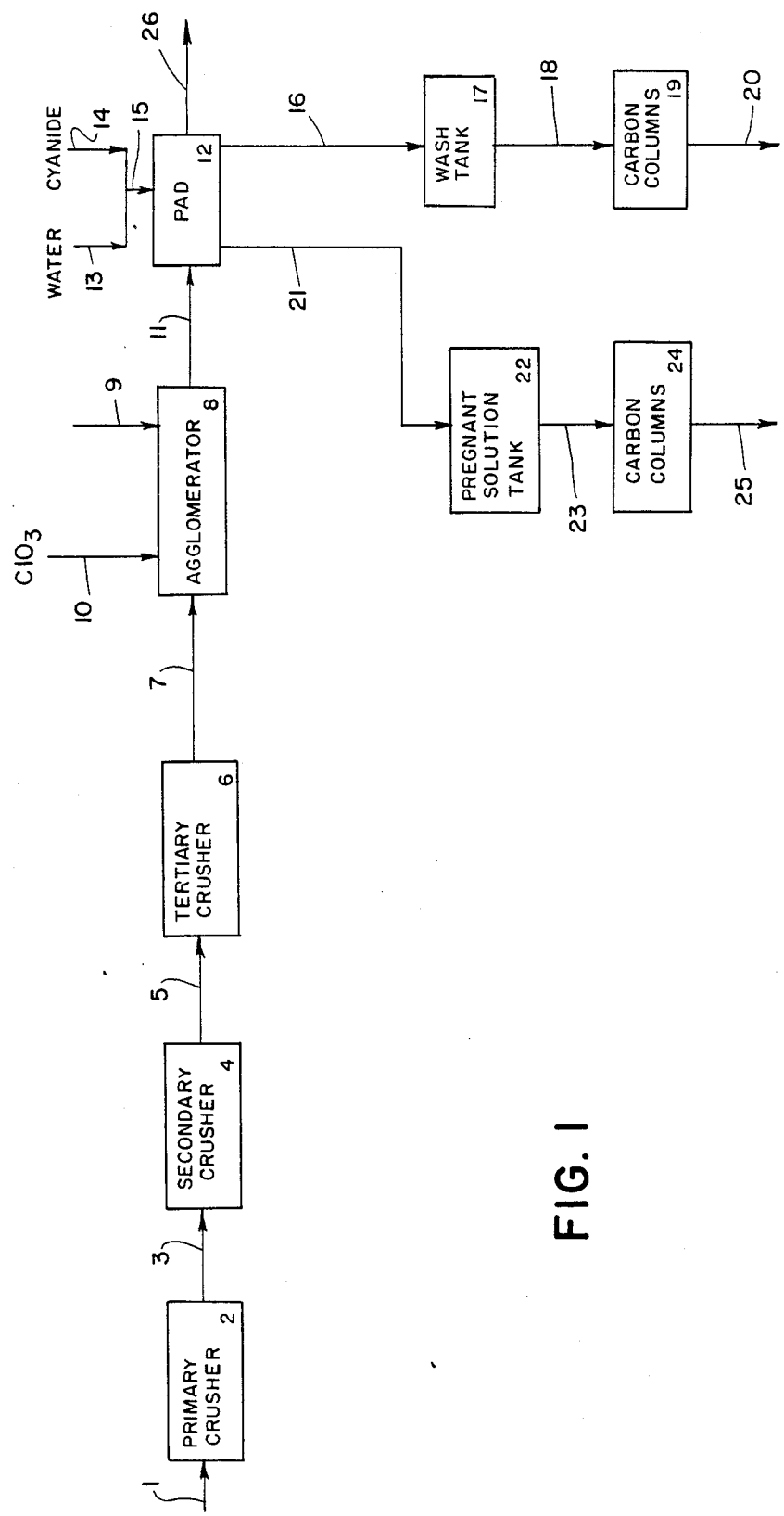
FIG. 1 is a block diagram of an agglomerative heap leaching process which incorporates the preferred embodiment of the method of the present invention.

The oxidative pretreatment/agglomerative heap leaching process described herein is intended primarily for treating gold-containing ores and silver-containing ores which are refractory because of their content of sulfidic and/or organic carbonaceous matter. The invention is most effective when used on ores containing less than about 1.0% sulfidic matter and/or less than about 0.5% organic carbonaceous matter.

The ore is first crushed to a suitable size, typically about −½ inch, i.e. 100% passing a ½ screen opening. The crushed ore particles are then passed to an agglomerator where they are mixed with about 5 to 20 pounds of binder (portland and/or gypsum cement) per ton of ore and a hypochlorite source, preferably sodium or calcium hypochlorite, with the hypochlorite source being added in an amount equivalent to about 5 to 45 pounds of available chlorine per ton of ore. The mixture is then rolled for a sufficient time in an agglomerating drum for agglomerates to form. Agglomerating time will vary considerably because of changing ore characteristics but, for most ores, about 5 to 10 minutes are required. The agglomerates formed therein are transported to a leaching pad where they are stacked to a height of about 10 to 40 ft. and allowed to cure for about 1 to 3 days. A water wash then removes residual hypochlorite values. The stacked agglomerates are then leached with a dilute, alkaline sodium cyanide solution (1 gram per liter NaCN) at the rate of about 0.003 to 0.005 gpm/ft$^2$ for 20 to 60 days. Gold, silver or other metals are extracted from the pregnant leach solution by standard recovery techniques. Gold and/or silver are recovered through techniques such as through the use of carbon adsorption columns or the use of a zinc precipitation technique. The agglomerate stack is then finally washed with water to remove residual gold and/or silver cyanide and the agglomerates are removed from the leach pad and sent to waste.

In a modification of the preferred embodiment of the invention, the crushed ore particles exiting the secondary crusher are divided into a coarse particle stream and a fine particle stream. The coarse particle stream then undergoes additional crushing in a tertiary crusher with the fine particle stream from that crusher being recombined with the fine particle stream from the secondary crusher. The combined fine particle stream is then admixed with portland and/or gypsum cement binder before entering the agglomerator. Sodium or calcium hypochlorite or other hypochlorite source is added directly to the agglomerator. The remainder of the procedure is identical to that previously described.

Although the process is directed primarily to the extraction of gold and silver from refractory gold and silver ores, the process is applicable to the extraction of other metals such as uranium and copper contained in refractory ores whenever the refractory nature of the ores can be altered by pretreatment with oxidizing chemicals.

DETAILED DESCRIPTION OF THE INVENTION

Following is a description of the oxidative agglomerative heap leaching process employing the preferred embodiment of the invention. Because of the existing high price of gold, the invented method has more present application for treating gold-containing ores which are refractory because of their content of organic carbonaceous and/or sulfidic matter. Therefore in the detailed description of the invention the invention will be described with regard to gold ores. However, it can be utilized with silver, uranium and copper ores and other organic carbonaceous and/or sulfidic matter containing ores. The invention is most effective when used on ores containing less than about 1.0% sulfidic matter and/or less than about 0.5% organic carbonaceous matter.

Referring to FIG. 1, a gold-containing ore is passed by line 1 to primary crusher 2. The partly crushed ore is then passed by line 3 to secondary crusher 4 and, then, via line 5 to tertiary crusher 6. Ore particles exiting tertiary crusher have been reduced in size to a suitable size, typically about −½ inch and are next transferred via line 7 to agglomerator 8. The degree of crushing required will depend, to a certain extent, on the refractory nature of the ore. It may be desirable, for example, to crush the more refractory ores to smaller sizes thereby exposing more surface area to chemical action by the subsequent hypochlorite and cyanide treatments. On the other hand, less refractory ore may require less crushing to obtain satisfactory gold yields.

A binder, either portland cement or gypsum cement, is added to agglomerator 8 via line 9 at the rate of about 5 to 20 pounds per ton of ore. Combinations of portland cement and gypsum cement may also be used. Lime may also be used but is less preferred than portland cement or gypsum cement. Sodium or calcium hypochlorite, the preferred source of hypochlorite, is added via line 10 to agglomerator 8 in an amount equivalent to about 5 to 45 pounds or more, preferably about 15 to 22 pounds, of available chlorine per ton of ore. The sodium or calcium hypochlorite is added as an approximate 10% aqueous solution. The concentration of this solution is not critical and can vary. Other hypochlorite-providing compounds may be used instead of sodium or calcium hypochlorite, however, the inventors have found these two sources of hypochlorite to be both economical and easy to handle. The ore-binder-hypochlorite mixture is then mixed and rolled in agglomerator 8 for a period of about 5 to 10 minutes. The mixing/rolling action causes agglomerates of ore particles to form. The agglomerated particles formed are then transferred via ore conveying equipment 11 to pad 12 which may be constructed of asphalt or other similar impervious or semi-impervious material. The agglomerates are stacked in heaps on pad 12 to a height of about 10 to 40 feet depending on agglomerate strength.

The agglomerate heaps are allowed to cure for 1 to 5 days depending on operational constraints. During the cure period, the strength of the agglomerates improves as the cementing reactions proceed. The cure period also allows the hypochlorite ions ample time to react with and modify, destroy or passivate substantial quantities of the refractory sulfidic and/or organic carbonaceous components contained in the ore. The cured agglomerates are next washed with water 13 via piping system 15 to remove residual hypochlorite values. The wash water percolates through the agglomerate heaps, is collected in run-off ditches located around pad 12, and is periodically transferred via line 16 to wash tank 17. The hypochlorite-containing wash water contains gold values due to the ability of hypochlorite ions to react with and dissolve gold. The wash water is periodically removed from wash tank 17 via line 18 and is forwarded to carbon columns 19 where the gold values are adsorbed by the activated carbon contained in the carbon columns 19. The gold-free wash water then exits the carbon columns via line 20 and can be sent to waste or recycled for use in preparing the hypochlorite solution used in the agglomerator 8. The wash operation is continued until the residual hypochlorite level in the wash water disappears or reaches a predetermined, low level.

After the washing operation is completed, the ore heaps are leached for at least 30 days with a dilute alkaline cyanide solution 14 containing about 0.5 to 2.0 grams per liter of sodium cyanide and preferably approximately 1 gram/liter sodium cyanide and about 0.3 to 1.0 grams/liter of sodium hydroxide, and preferably approximately 0.5 gram/liter sodium hydroxide. The period of time can exceed 30 days and will be dictated primarily by the remaining gold values and the need of the pad for further production. The alkaline cyanide solution is continuously distributed by piping system 15 on top of the ore heaps on pad 12. Leach solution flow rates are maintained at approximately 0.005 gallons per minute per square ft. for the chosen number of days leach cycle. The alkaline cyanide leach solution percolates through the ore heap dissolving gold and collects in the run-off ditches located on pad 12. The leach solution, pregnant with gold, is periodically pumped via line 21 from the pad 12 run-off ditches to pregnant solution tank 22. The pregnant solution is periodically forwarded via line 23 to carbon columns 24 where the gold values are adsorbed by the activated carbon contained in the carbon columns 24. The gold-free leach solution then exits the carbon columns 24 via line 25 and can be sent to waste or recycled for use in preparing the alkaline cyanide feed leach solution 14.

A water wash step follows the cyanide leach step. The flow of the water wash is identical to that of the cyanide leach solution described above. Water washing is continued until the residual cyanide level in the wash water disappears or reaches a predetermined, low level consistent with legal environmental requirements. The leached and washed gold ore agglomerates can then be removed from the pad via ore conveying equipment 26 and returned to the mining area from which it was taken.

The pad and associated equipment may be constructed in such a way that various heap leaching operations can proceed simultaneously. For example, leaching operations may be in progress on several heaps while washing operations may simultaneously be in progress on several other heaps. At the same time, new heaps may be in the process of being constructed while other spent heaps may be in the process of being removed from the pad. The efficiency of the present invention will not be affected by such activities.

Figure 2:
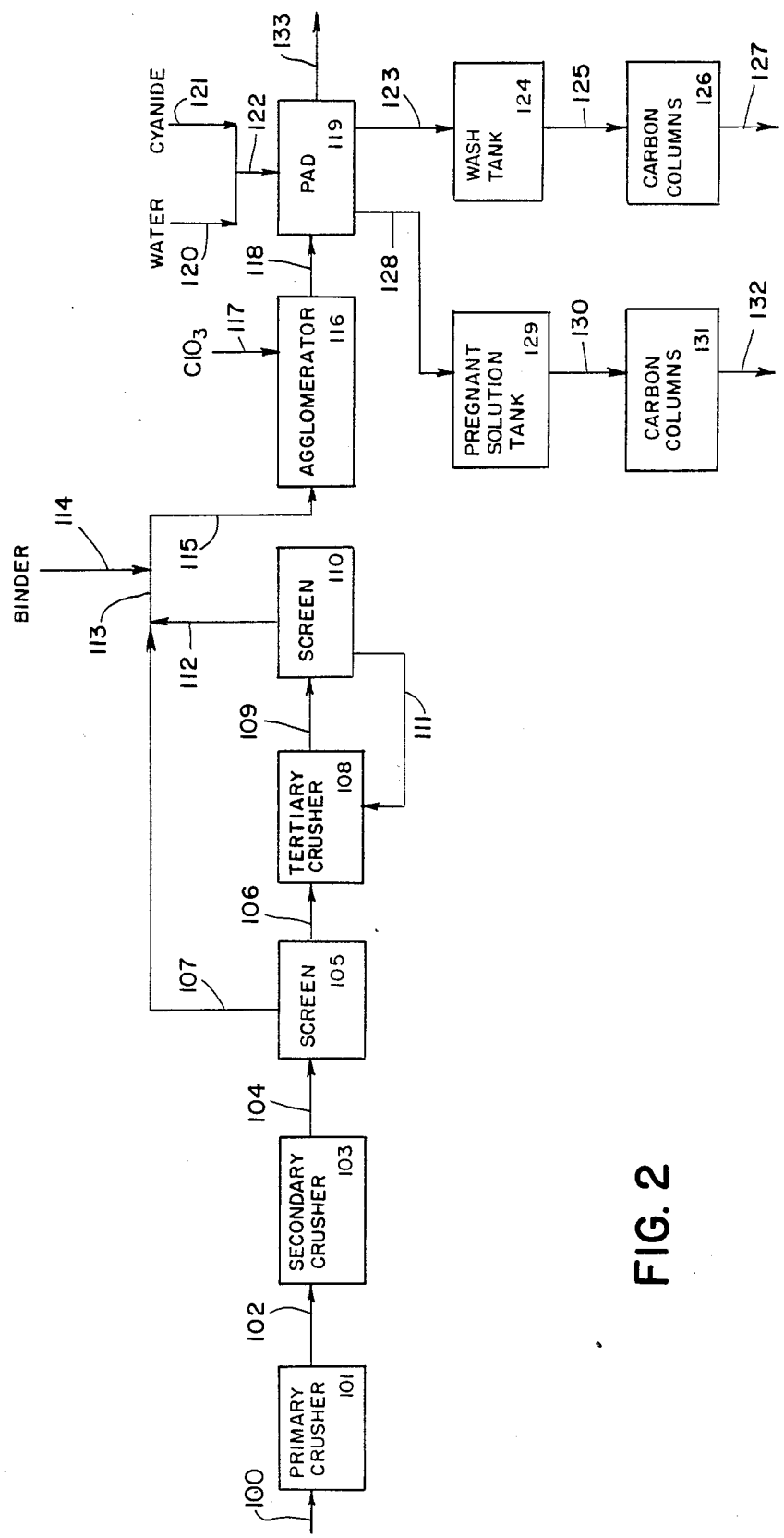
FIG. 2 is a block diagram of a modification of the preferred embodiment of the method of the present invention.

A modification of the preferred embodiment of the invention is shown in FIG. 2. In this embodiment, the crushed ore particles exiting secondary crusher 103 are screened and divided into a coarse particle stream and a fine particle stream. The coarse particle stream undergoes additional crushing in a tertiary crusher. Eventually, all fine ore particles are recombined and admixed with Portland and/or gypsum cement binder before entering the agglomerator where sodium or calcium hypochlorite is added. Referring to FIG. 2, ore enters primary crusher 101 via line 100. The ore is then passed via line 102 to secondary crusher 103. The partly crushed, fines—containing ore is next passed to screening equipment 105 via line 104 in which it is separated into a coarse particle stream, i.e. comprised of $+\frac{1}{2}$ inch particles and a fine particle stream comprised of $-\frac{1}{2}$ inch particles. The fine ore particle stream exits screening equipment 105 via line 107 and the coarse particle stream exits screening equipment 105 via line 106. The coarse particle stream is then moved to tertiary crusher 108 where the ore particles are reduced to typically about $-\frac{1}{2}$ inch. The crushed ore particles are then transferred via line 109 to screening equipment 110. The coarse ore particles are recycled via line 111 to tertiary crusher 108 for additional crushing. The fine ore particles are removed from screening equipment 110 via line 112 and recombined with the original fine particle stream 107 from screening equipment 105. A binder, portland cement and/or gypsum cement, is added by line 114 to the recombined ore stream being moved by line 113. The cement-binder mix is then transferred by line 115 to the agglomerator 116 to which sodium or calcium hypochlorite is added by line 117. The remainder of the procedure is identical to that previously described for the process of FIG. 1.

This part of the process consists of transferring the agglomerated ore particles via ore moving equipment 118 to pad 119. The agglomerates are stacked to a height of about 10 to 40 feet depending on agglomerate strength. The agglomerate heaps are allowed to cure during which the strength of the agglomerates improves with the cure period also allowing the hypochlorite ions ample time to react with and modify, destroy or passivate substantial quantities of the refractory sulfidic and/or organic carbonaceous components contained in the ore. The cured agglomerates are next washed with water 120 via piping system 122 to remove residual hypochlorite values. The wash water percolates through the agglomerate heap, is collected in run-off ditches located around pad 119, and is periodically transferred via line 123 to wash tank 124. The hypochlorite-containing wash water contains gold values due to the ability of hypochlorite ions to react with and dissolve gold. The wash water is periodically removed from wash tank 124 via line 125 and is forwarded to carbon columns 126 where the gold values are absorbed by the activated carbon contained in the carbon columns 126. The gold-free wash water then exits the carbon columns 126 via line 127 and can be sent to waste or recycled for use in preparing the hypochlorite solution used in the agglomerator 116. The wash operation is continued until the residual hypochlorite level in the wash water disappears or reaches a predetermined, low level.

After the washing operation is completed, the ore heaps are leached for at least 30 days with a dilute alkaline cyanide solution 121 containing about 0.5 to 2.0 grams/liter of sodium cyanide and preferably approximately 1 gram/liter sodium cyanide and about 0.3 to 1.0 grams/liter of sodium hydroxide, and preferably approximately 0.5 gram/liter sodium hydroxide. The alkaline cyanide solution is continuously distributed by piping system 122 on top of the ore heaps on pad 119. Leach solution flow rates are maintained at approximately 0.005 gallons per minute per square ft. for the chosen number of days leach cycle. The alkaline cyanide leach solution percolates through the ore heap dissolving gold and collects in the run-off ditches located on pad 119. The leach solution, pregnant with gold, is periodically pumped via line 128 from the pad 119 run-off ditches to pregnant solution tank 129. The pregnant solution is periodically forwarded via line 130 to carbon columns 131 where the gold values are adsorbed by the activated carbon contained in the carbon columns 131. The gold-free leach solution then exits the carbon columns 131 and can be sent to waste or recycled for use in preparing the alkaline cyanide feed leach solution 121.

A water wash step follows the cyanide leach step. The flow of the water wash is identical to that of the cyanide leach solution described above. Water washing is continued until the residual cyanide level in the wash water disappears or reaches a predetermined, low level consistent with legal environmental requirements. The leached and washed gold ore agglomerates can then be removed from the pad via ore conveying equipment 133 and returned to the mining area from which it was taken.

The essence of this invention lies in the incorporation of hypochlorite directly into the agglomerates as the agglomerates are formed. In effect, the agglomerates are converted into micro-scale batch reactors. Unlike the standard hydrometallurgical technique of adding the reactant to a slurry in a dispersed, relatively dilute solution phase, the oxidative agglomeration process adds a concentrated reactant phase directly to the ore thereby increasing the reaction driving force. This provides ample opportunity for the well-known ability of hypochlorite to oxidize and destroy sulfidic and/or carbonaceous matter thereby enabling high gold recovery efficiencies to be achieved.

Although the description is directed primarily to gold-containing refractory ores whose refractory nature is caused by their content of sulfidic and/or organic carbonaceous matter, the invention can also be effectively used to treat refractory ores whose refractory nature is caused by factors other than organic carbonaceous and sulfide content. Also as noted above the process is also applicable to the refractory ores of other metals wherein a metal such as silver, uranium or copper is recoverable from its ore via agglomerative heap leaching and wherein chemical pretreatment is effective in oxidizing substantial portions of refractory-causing substances, thereby favorably altering the refractory nature of the ore.

EXAMPLES

The invention will now be further explained by reference to a series of tests which were performed to demonstrate the process. The tests discussed are illustrative examples and are not intended to be limiting.

In the tests, agglomerates of refractory, gold-containing ore were prepared with and without sodium hypochlorite being incorporated into the agglomerates. The subsequent cyanide leaching step, conducted in 6 inch diameter test columns, then allowed the effect of the sodium hypochlorite incorporation to be easily seen.

The tests were performed on four Jerritt Canyon, Nev. ores of different leach ratios: 14%, 33%, 40% and >60%. The leach ratio of an ore is determined by contacting the ore with an equal weight of a solution containing sodium cyanide (5 grams per liter) and sodium hydroxide (1 gram per liter). The mixture is then centrifuged and the gold content of the supernatant liquid is determined preferably by atomic absorption spectroscopy. The ratio of the gold contained in the supernatant liquid and the gold originally contained in the ore, preferably determined by fire assay, is termed the leach ratio of the ore. The leach ratio is a rough, but reliable, measure of the percentage gold recovery that can be expected to be obtained from gold ores via standard cyanide leach operations. The leach ratio is considered to be a rough measure of the relative refractory nature of gold ores with the refractoriness varying in inverse proportion to the leach ratio. Thus, a gold ore with a high leach ratio will be less refractory and will usually yield higher percentage gold extraction to standard cyanide leaching operations than a gold ore with a lower leach ratio.

The Jerritt Canyon ores tested varied in their content of sulfidic and organic carbonaceous matter as shown in Table 1:

TABLE 1

| COMPOSITION OF ORES TESTED | | | | |
|---|---|---|---|---|
| | Ores | | | |
| | 1 | 2 | 3 | 4 |
| Leach Ratios (%) | 14 | 33 | 40 | >60 |
| Gold (oz/ton) | 0.042 | 0.089 | 0.123 | 0.178 |
| Total Sulfide (%) | 0.22 | 0.10 | 0.55 | 0.10 |
| Organic Carbon (%) | 0.32 | 0.29 | 0.14 | 0.19 |

Each of the four Jerritt Canyon test ores was crushed to minus ¼ inch. The crushed ore was then divided into three equal charges of approximately 135 pounds each. One of the three charges was agglomerated without incorporating sodium hypochlorite into the agglomerates. Two of the charges were agglomerated with sodium hypochlorite incorporated directly into the agglomerates. The same procedure was used for each of the four Jerritt Canyon ore types.

The agglomerates were made in a commercial mortar mixer equipped with a stationary drum with four overlapping, rotating, rubber-tipped mixing arms. Each batch of agglomerates was made by the following procedure: The ore charge of approximately 135 pounds was placed in the mortar mixer and cement binder was added in an amount equivalent to 10 pounds of cement per ton of ore. Rotation of the mixing arms was then begun and allowed to continue for about 10 minutes thus allowing ample time for the ore and binder to mix. Water or a water-sodium hypochlorite solution, i.e. 10.2% NaOCl content, was sprayed into the mixing drum as a fine mist. Rotation of the mixing arms continued during this solution/water addition step. Solution/water addition was continued for about five minutes allowing water or NaOCl-water solution to be added in an amount equivalent to 150 to 220 pounds per ton of ore. This is equivalent to the addition of about 15 to 22 pounds of available chlorine per ton of ore. The agglomerates were then placed in sealed plastic bags for three days to cure prior to their being loaded into the test columns.

The 6-inch diameter columns used in the leaching tests were constructed of clear polyvinyl chloride. The agglomerates were taken from the sealed plastic bags and poured into the columns to an average height of about 96 inches. The water wash cycle was then begun with the introduction of water into the top of the column at a flow rate of about 0.005 gpm/ft.$^2$. The wash water flowed through the agglomerate-loaded column exiting at the bottom. The residual hypochlorite content of the wash water was measured periodically. Approximately three days were required for the wash water hypochlorite residual to dissipate at which time the water wash cycle was discontinued.

The cyanide leach step was then begun and was carried out at the same solution flow rate (0.005 gpm/ft.$^2$) as the wash step. The cyanide leach solution contained 1 gram/liter sodium cyanide and approximately 0.5 gram/liter sodium hydroxide. Gold extraction was monitored by daily solution gold assays (atomic absorption spectrometric analysis). Overall gold extraction was determined by solids gold assays (classical fire assays) on agglomerate samples prior to the beginning of the column tests and at the conclusion of the column tests. Leaching was considered complete when solution gold assays reached <0.01 mg/l gold for several consecutive days. For all ore types, i.e. ore leach ratios tested, with or without sodium hypochlorite, most gold extraction was accomplished within 20 to 30 days leaching although a diminishing amount of gold continued to be obtained even in the final day of leaching. FIG. 3 shows the solution gold extraction pattern for the 40% leach ratio ore. This general extraction pattern was similar with all type ores tested. After leaching was completed, a water wash was conducted to remove residual gold-containing cyanide. The results of the tests are shown in Table 2.

TABLE 2

RESULTS OF COLUMN LEACH TESTS WITH AND WITHOUT SODIUM HYPOCHLORITE INCORPORATED INTO ORE AGGLOMERATES

| Ore Leach Ratio (%) | Days of Cyanide Leaching | CUMULATIVE EXTRACTION | |
|---|---|---|---|
| | | With NaOCl | Without NaOCl |
| 14 | 53 | 62 | 14 |
| 33 | 76 | 67 | 44 |
| 40 | 68 | 75 | 58 |
| >60 | 68 | 80 | 69 |

Table 2 clearly illustrates the advantage of incorporating hypochlorite in the agglomerates. The process is particularly effective for the more refractory ores which are most likely to be non-responsive to previously existing heap leaching techniques.

We claim:

1. An improved method of extracting metals selected from the group consisting of gold and silver from refractory ores wherein said ores are agglomerated and heap leached with cyanide lixiviants, the improvement which comprises incorporating at least one hypochlorite-providing compound into the agglomerates as said agglomerates are formed, washing said agglomerates to remove residual hypochlorite-providing compound and leaching said agglomerates with cyanide lixiviants.

2. An improved method as in claim 1 wherein the refractory nature of said ores is caused by their content of sulfidic and/or organic carbonaceous matter and wherein said ores are agglomerated and heap leached with cyanide lixiviants, the improvement which comprises, incorporating at least one hypochlorite-providing compound into said agglomerates as said agglomerates are formed, washing said agglomerates for a first period of time, and then leaching said agglomerates with cyanide lixiviants.

3. An improved method as in claim 2 in which the hypochlorite-providing compound added is sodium hypochlorite which is added in an amount equivalent to about 5 to 45 pounds of available chlorine per ton of ore.

4. An improved method as in claim 2 in which the hypochlorite- providing compound added is sodium hypochlorite which is added in an amount equivalent to about 15 to 22 pounds of available chlorine per ton of ore.

5. An improved method as in claim 2 in which the hypochlorite-providing compound added is calcium hypochlorite which is added in an amount equivalent to about 5 to 45 pounds of available chlorine per ton of ore.

6. An improved method as in claim 2 in which the hypochlorite-providing compound added is calcium hypochlorite which is added in an amount equivalent to about 15 to 22 pounds of available chlorine per ton of ore.

7. An improved method as in claim 2 wherein said metal is gold.

8. An improved method as in claim 2 wherein said metal is silver.

9. An improved method as in claim 2 in which the hypochlorite is retained in the agglomerates for 1 to 5 days prior to washing said agglomerates with water and leaching said agglomerates with cyanide lixiviants.

10. A method for recovering metals selected from the group consisting of gold and silver from ores containing the same which ores are refractory because of the ore's content of sulfidic and/or carbonaceous matter comprising:

a. subjecting said refractory ore to crushing operations to essentially reduce the ore particle size of said refractory ore to less than about ½ inch diameter;

b. introducing said crushing refractory ore to an agglomerator;

c. adding to said agglomerator containing said crushed refractory ore a binder selected from the group consisting of Portland cement, gypsum cement, or a mixture of the two, at the rate of about 5 to 20 pounds per ton of ore;

d. adding to said agglomerator containing said crushed refractory ore and said binder, a 5 to 15% aqueous solution selected from the group consisting of sodium hypochlorite, calcium hypochlorite or mixtures thereof in an amount equivalent to about 5 to 45 pounds of available chlorine per tone of ore;

e. agitating the mixture of refractory ore, binder, and aqueous hypochlorite solution contained in said agglomerator for sufficient time to obtain satisfactory distribution of mixture components;

f. rolling said agitated mixture contained in said agglomerator for sufficient time to allow agglomerates of coarse and fine refractory ore particles to form;

g. transferring said agglomerates to an impervious or semi-impervious pad;

h. allowing said agglomerates contained on said pad to cure for about 1 to 5 days, i. water washing said agglomerates contained on said pad for sufficient time to remove all or substantially all hypochlorite values;

j. leaching said agglomerates contained on said pad with a dilute alkaline cyanide solution containing about 0.5 to 2.0 grams/liter of sodium cyanide and about 0.3 to 1.0 grams/liter of sodium hydroxide, for sufficient time to dissolve a substantial part of at least one of the metals being recovered and contained in said ore, and k. recovering said dissolved at least one metal from solution.

11. The method of claim 10 in which the sodium hypochlorite or calcium hypochlorite is added in an amount equivalent to about 15 to 22 pounds of available chlorine per ton of ore.

12. The method of claim 10 comprising feeding said ore to a primary crusher and then feeding the primary crushed ore to a secondary crusher, screening said crushed ore from the secondary crusher and feeding the fraction having a particle size of less than about ½ inch diameter to said agglomerator, feeding oversized fraction to a tertiary crusher, screening the output from the tertiary crusher, feeding the fraction having a particle size of less than about ½ inch diameter to said agglomerator, and recycling the oversized fraction to said tertiary crusher.

13. The method of claim 10 wherein said metal being recovered is gold.

14. The method of claim 10 wherein said metal being recovered is silver.

15. Agglomerates of a refractory ore which contain a binder and a source of hypochlorite ion in an amount of about 5 to 45 pounds of available chlorine per ton of ore, wherein the agglomerates are amenable for washing to remove residual hypochlorite and amenable to subsequent cyanide leaching to recover metals contained in the ore.

16. Agglomerates of a refractory ore as in claim 15 wherein said hypochlorite is available in an amount of about 15 to 22 pounds of available chlorine per ton of ore.

17. Agglomerates of a refractory ore as in claim 15 wherein said source of hypochlorite ion is selected from the group consisting of sodium hypochlorite, calcium hypochlorite, and mixtures thereof.

18. Agglomerates of a refractory ore as in claim 15 wherein said ore is a gold ore.

19. Agglomerates of a refractory ore as in claim 15 wherein said ore is a silver ore.

20. A method of recovering gold, silver or mixtures thereof from a refractory ore containing sulfidic or organic carbonaceous matter comprising:
(a) crushing the ore;
(b) agglomerating the crushed ore with an aqueous solution of sodium hypochlorite, calcium hypochlorite or mixtures thereof;
(c) curing the agglomerates for sufficient time to allow the carbonaceous or sulfidic matter to be substantially oxidized;
(d) washing the agglomerates with water to remove residual sodium hypochlorite, calcium hypochlorite or mixture thereof;
(e) heap leaching the agglomerates with a cyanide-containing solution to remove the gold or silver; and
(f) recovering the gold or silver from the cyanide-containing solution.

* * * * *